April 14, 1942.  J. C. McCUNE  2,279,407
ELECTRIC AND FLUID PRESSURE BRAKE CONTROL
Filed Jan. 30, 1941
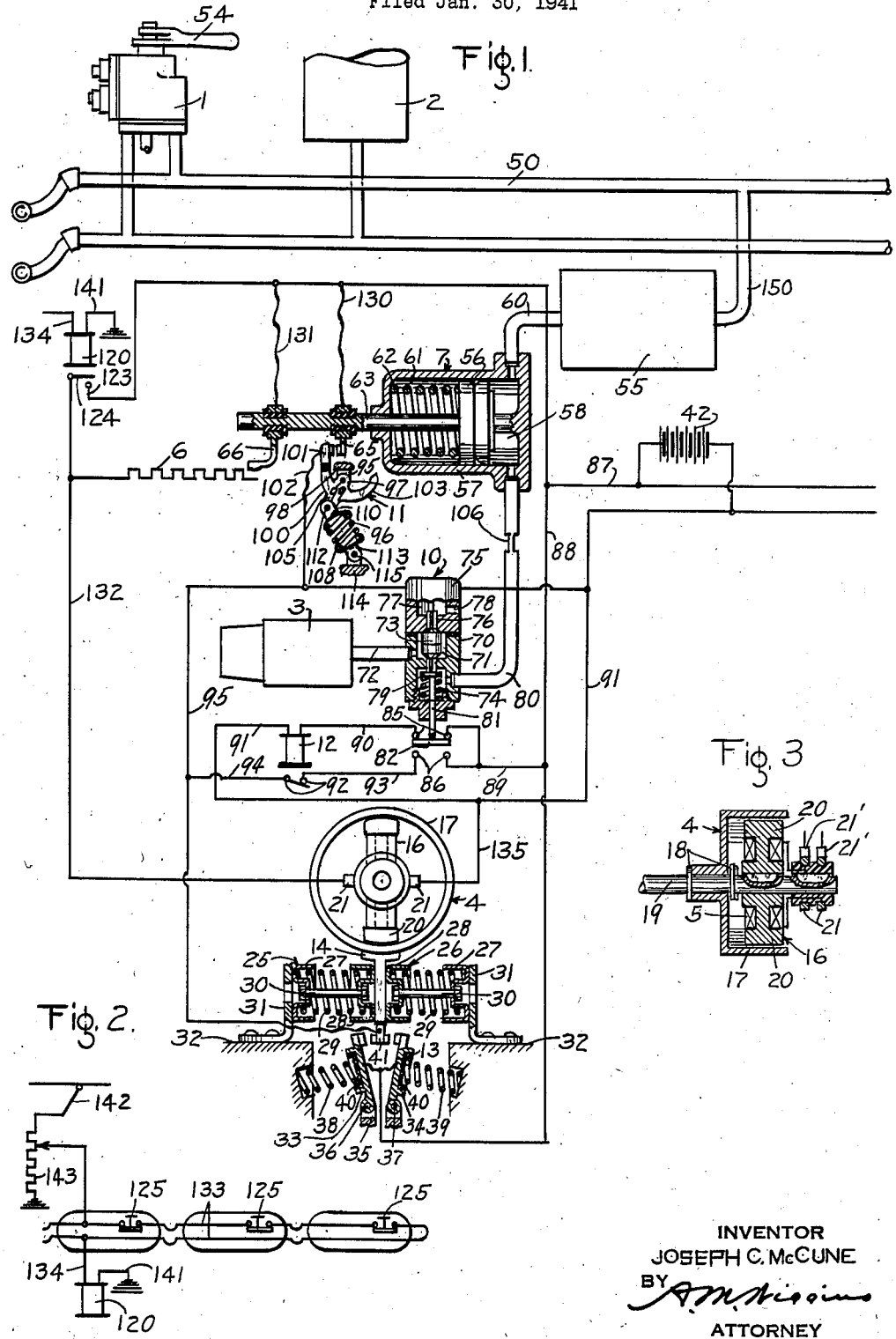
INVENTOR
JOSEPH C. McCUNE
BY
ATTORNEY Patented Apr. 14, 1942

2,279,407

UNITED STATES PATENT OFFICE 2,279,407

ELECTRIC AND FLUID PRESSURE BRAKE CONTROL

Joseph C. McCune, Edgewood, Pa., assignor to The Westinghouse Air Brake Company, Wilmerding, Pa., a corporation of Pennsylvania Application January 30, 1941, Serial No. 376,591

16 Claims. (Cl. 303—3)

This invention relates to a vehicle brake system of the type having electrodynamic and friction brakes and more particularly to the control thereof.

As is well known in the braking art there are cases where it is desirable to employ a brake of the electrodynamic type, such for example as an eddy current brake, and to supplement the braking effect of the eddy current brake by the braking effort of a friction brake. It is also well known that there is employed, in brake systems of this type, means for suppressing the effectiveness of the friction brake until the effectiveness of the eddy current brake fades or diminishes, so that at low vehicle speeds the friction brake will act to provide the desired braking effect to bring the vehicle to a smooth and gentle stop.

It is a general object of this invention to provide a dual braking system of this general type having improved control apparatus for effecting an application of electric brakes at relatively high speeds and for automatically releasing the electric brakes and applying the friction brakes at relatively lower speeds, in such a manner as to bring a vehicle to a stop quickly and without appreciable shock.

Another object of the invention is to provide an interlock means between an electric brake equipment and a fluid pressure brake equipment which acts in accordance with the effectiveness of the electric brake to prevent application of the fluid pressure brake so long as the electric brake is effective to provide the desired braking action and to automatically release the electric brake when it is no longer effective to provide the desired braking action, and to simultaneously cause the fluid pressure brake to be applied with sufficient braking force to produce substantially the same retarding effect as produced by the electric brake, so that the vehicle may be brought quickly and smoothly to a stop.

A further object of the invention is to provide a combined electric and friction brake equipment having means controlled according to the braking torque exerted by the electric brake for holding the friction brake released until the braking torque of the electric brake has reduced to some predetermined low value.

Other important objects and advantages will be apparent from the following description taken in conjunction with the attached drawing, in which:

Fig. 1 is a schematic and diagrammatic view illustrating a combined electric and fluid pressure brake system embodying the invention, the system as shown being arranged for control from the head end or control car of the train.

Fig. 2 is a partial schematic arrangement of a train showing a circuit for controlling the emergency relay associated with the brake system illustrated in Fig. 1.

Fig. 3 is an elevational, detail sectional view showing an eddy current brake device which constitutes a part of the electric brake equipment illustrated in Fig. 1.

Referring now to the drawing, the equipment illustrated comprises a brake valve device 1 which is operative for controlling the supply of fluid under pressure from a suitable source, such as a main reservoir 2, to control the application of both the electrodynamic and the fluid pressure brakes.

The fluid pressure brake equipment includes a brake cylinder 3 of the usual fluid pressure type, which is adapted to actuate a friction brake of any suitable type, such as the usual well known conventional clasp brake associated with the wheels of a vehicle.

The electric brake equipment may include any type of electro-dynamic brake device, and I have as an example illustrated the eddy current type, indicated at 4, which is provided with an exciting winding 5, which controls the braking. For controlling the circuit to the winding 5 there is provided a current regulating rheostat 6 in series with the winding 5 and a fluid pressure responsive device 7 for actuating the rheostat in accordance with the fluid pressure supplied by the brake valve device 1.

Interlock apparatus for preventing concurrent application of the brakes of the two brake equipments may include a magnetically operated valve device 10, a toggle switch 11, a slow release relay 12, a torque responsive control mechanism, which, in the present embodiment of the invention is in the form of an electric switch mechanism 13 and a torque arm 14 associated with the electric brake for actuating said switch mechanism.

Considering now the parts of the equipment in greater detail, the eddy current braking device 4 is diagrammatically indicated as having a rotor member 16 and a stator member 17. The stator member 17 is rotatably mounted on collars 18 provided on a shaft 19 which is an extension of the shaft for the usual driving motors (not shown). The stator member 17 is preferably of cup-shaped design so that the rotor member 16, which is rigidly secured to the shaft 19, may be mounted within the stator member as shown in Fig. 3 of the drawing. The torque arm 14 is integrally formed on or otherwise rigidly attached to the stator member 17, and is provided for the purpose of actuating the switch mechanism 13 as hereinafter described. The rotor member 16 is provided with pole pieces 20 which carry electromagnetic windings 5. Collector or slip rings 21 rigidly secured to the shaft 19 in insulated relationship with the shaft and each other are provided for establishing electrical connections to the winding from a pair of stationary brush members 21' of the electric brake circuit.

As is well known in connection with electric brake devices of this character, when the windings 5 are energized and the rotor member 16 is rotated, eddy currents are induced in the stator, with the result that a torque force is exerted thereon tending to rotate it in the direction of rotation of the rotor. Yielding means, as hereinafter described, is provided to resist but permit limited movement of the stator member, so that reaction between these eddy currents and the magnetic flux produced by the winding 5 produces a retarding or braking effect upon the rotor member, and the degree of movement on the stator may be taken as a measure of the braking effect produced by the eddy current brake.

The yielding means above referred to may be a portion of the torque responsive control mechanism and in the present embodiment is shown as comprising a pair of spring assemblies 25 and 26, the assembly 25 being located at one side of the torque arm 14 and the assembly 26 being located at the opposite side of the arm. Each assembly comprising a spring seat 27 which is welded or otherwise secured to a bracket 31 which is secured to a fixed portion 32 of the truck, as shown on the drawing, and also comprising a spring seat 28 adapted to engage one side of the torque arm 14. Interposed between and operatively engaging the spring seats 27 and 28 is a spring 29. The seats 27 and 28 are connected together by a bolt 30 which acts to hold the spring 29 initially compressed to a certain degree, and from an inspection of the drawing it will be evident that the spring 29 may be further compressed but cannot expand beyond its normal limit.

The switch mechanism 13 which is operative by the torque responsive mechanism for controlling an electric circuit through which current may be supplied from a storage battery 42 to the magnetically operated valve device 10, comprises two contact arms 33, 34 which are pivotally secured to a bracket 35 by means of pins 36 and 37, respectively. The contact arms 33 and 34 are normally biased to and maintained in the position shown by means of springs 38 and 39, respectively. The springs 38 and 39 are interposed between an insulating element 40 carried by each of the arms 33 and 34 and a portion of the truck, as shown in Fig. 1 of the drawing.

The torque arm 14 is provided at the outer end thereof with a contact 41, which is connected to the magnetically operated valve device 10 by means of a conductor 95. The contact 41 is adapted to engage either of the contact arms 33 or 34 and is insulated from the arm proper through proper insulation, as indicated on the drawing.

The eddy current brake exciting windings 5 are intended to be energized from the battery 42 and the degree of application is controlled by varying the current in the winding by means of a rheostat such as shown at 6, except for an emergency condition to be described later. Varying the current supplied varies the flux produced and the variation of this current is made to correspond with variations in fluid pressure controlled by the brake valve device 1.

The brake valve device 1 is preferably of the self-lapping type, of well known construction, such as shown in the Patent 2,042,112 of E. K. Lynn and R. J. Bush. It controls the supply of fluid under pressure from the main reservoir 2 to a control pipe 50, to cause application of the brakes, and also controls the release of fluid under pressure from the control pipe to release the brakes. It is deemed unnecessary for present purposes to describe the construction and operation of the self-lapping brake valve device 1 in detail, it only being necessary to understand that the pressure established in the control pipe 50 is in accordance with the degree of movement of an operating handle 54 of the brake valve device 1 from a normal release position into an application zone.

According to the invention, a volume reservoir 55 is interposed between the control pipe 50 and the fluid pressure responsive device 7, which reservoir is charged with fluid under pressure from the control pipe 50. From this charged reservoir fluid under pressure is supplied to effect an application of both the eddy current and the friction brakes.

The fluid pressure responsive device 7 for controlling the operation of the rheostat 6 in accordance with the fluid pressure established in the volume reservoir 55, comprises a movable abutment 56 operatively mounted in a casing 57. At one side of the abutment 56 is a chamber 58 which is in constant open communication with the reservoir 55, by means of a pipe 60. At the opposite side of the abutment 56 is a chamber 61 having mounted therein a spring 62 which is interposed between and operatively engages the abutment and inner end wall of the chamber 61. A stem 63 carried by abutment 56 projects beyond the exterior of the casing 57, and the projecting portion of the stem carries contact arms 65 and 66 which are insulated from the stem and from each other. Both of these contact arms are connected to the storage battery 42, the contact arm 65 being connected by means of conductors 87, 88 and 130, and the contact arm 66 being connected by means of connectors 87, 88 and 131, and are operative for a purpose hereinafter described.

The magnetically operated valve device 10, forming a part of the interlock mechanism for suppressing an application of the friction brake, comprises a casing 70 having a chamber 71 which is in constant communication with the brake cylinder 3, by means of a pipe 72. The chamber contains a double beat valve 73 urged towards an upper seat by a spring 74 and is adapted to be urged toward a lower seat by an electromagnet 75 upon energization of the winding thereof. The double beat valve 73 coacts with the upper seat to control communication between the chamber 71 and a chamber 77 which is in constant open communication with the atmosphere, by way of a passage 78, and also coacts with the lower seat to control communication between chamber 71 and a chamber 79 which is connected to a fluid pressure supply pipe 80 leading from chamber 58 of the fluid pressure responsive device 7. The double beat valve 73 is provided with a stem 81 which extends to the exterior of the casing and carries a contact member 82 which is insulated from the stem. Contact member 82 is adapted to engage a pair of stationary contacts 85, when the double beat valve 71 is in engagement with its upper seat, as shown in the drawing, and is adapted to engage a pair of stationary contacts 86 when the valve is in engagement with its lower seat.

One of the contacts 85 is connected to the storage battery 42, by means of conductors 87, 88 and 89. The other of the contacts 85 is connected to the opposite pole of the battery 42 through the electromagnetic coil of the slow release relay 12, by means of conductors 90 and 91. One of the contacts 86 is connected to the magnetically operated valve device 10 through the contacts 92 of the slow release relay 12, by means of conductors 93, 94 and 95. The other of the contacts 86 is connected to the battery 42 as shown. The slow release relay 12 is preferably of such design that upon deenergization thereof, as by opening of the contacts 85 of the magnetically operated valve device 10, the contacts 92 of the relay device 12 are not opened until after the expiration of some predetermined interval of time.

The toggle switch 11, which comprises a portion of the interlock mechanism, is employed for the purpose of initially establishing an electrical circuit for energizing the electromagnet of the magnetically operated valve device 10 and may comprise a lever mechanism 95 and a spring mechanism 96.

The lever mechanism 95 comprises an arm 97 which is pivotally secured to a bracket 98, fixed to the vehicle, by means of a pin 99. The mechanism further comprises an arm 100 which carries, insulated therefrom, a contact member 101 which is adapted to be engaged by the contact arm 65 and which by a conductor 102 is in turn connected to the conductor 95 leading to the magnetically operated valve device 10. The mechanism further comprises an arm 103 and an arm 105.

The spring mechanism 96 comprises a spring 108 having one end attached to a lug 110 which is pivotally secured to the arm 105 by means of a pin 112 and having the other end attached to a lug 113 which is pivotally secured to a bracket 114, fixed to the vehicle, by means of a pin 115.

To provide for an emergency application of the eddy current brake, a relay 120 having a stationary contact 123 and a movable contact 124 is provided. The stationary contact 123 is connected to the battery 42, by means of conductors 87 and 88. The movable contact 124 is connected to one of the collector or slip rings 21 leading to the exciting winding 5 of the eddy current brake, by means of a conductor 132. The winding of relay 120 is connected to an emergency wire 133 which extends throughout the length of the train and is connected to ground by way of a conductor 141. The relay is normally energized from a current supply source, such as a trolley wire, by way of a trolley 142, as shown in Fig. 2 of the drawing. A resistance potentiometer 143 is interposed to reduce the voltage on the relay circuit.

Operation

It will be assumed that the main reservoir 2 is charged, in the usual manner, with fluid under pressure, that the car is in motion and that the rotor 16 of the eddy current brake is rotating correspondingly, and that the handle 54 of the brake valve device 1 is in release position. In this position of the handle 54 the control pipe 50 and connected reservoir 55 are in communication with the atmosphere by way of the brake valve device so that the operating parts of the brake equipment are in their release position as shown.

When it is desired to make a normal stop from a running condition the operator shifts the handle 54 of the brake valve device to a service application position in the usual service application zone, whereupon fluid under pressure is supplied from the main reservoir 2, under the control of the self-lapping portion of the brake valve device 1, to the control pipe 50 and thence to the volume reservoir 55, by way of a pipe 150. Fluid under pressure supplied to volume reservoir 55 flows by way of pipe 60 to chamber 58 of the fluid pressure responsive device 7. The movable abutment 56 of the device 7 now responds to slight build up in the pressure of fluid in chamber 58 to move the stem 63 and thereby the contact arms 65 and 66, in a direction towards the left hand as viewed in the drawing. The initial movement of the abutment 56 causes the contact arm 65 to engage the contact 101 of the toggle switch 11, thus closing an electrical circuit from the battery 42 through the magnetically operated valve device 10, by way of conductors 87, 88, 130, contact arm 65, contact 101, connectors 102 and 95, thereby effecting the energization of the electromagnet 75. Energization of the electromagnet 75 causes the double beat valve 73 to move to its lower seated position, closing off communication between supply chamber 74 and chamber 71 and at the same time opening communication between chambers 71 and 77, so that the brake cylinder 3 is connected to the atmosphere, by way of pipe 72, chamber 71, past the upper seat of valve 73, chamber 75 and passage 78.

It will here be understood that the flow of fluid to the piston chamber 58 of the fluid pressure responsive device 7 will be at a much faster rate than is permitted by the communication 80 to the chamber 74 of the magnetically operated valve device 10, due to the pressure of the choke 106 in pipe 80, so that the valve 73 will cut off communication from the chamber 74 to the brake cylinder before sufficient fluid pressure can be built up in the brake cylinder to cause the brake cylinder to operate to apply the friction brakes.

As the double beat valve 73 moves to its lower seated position the contact 82, which moves with the valve, first disengages from contacts 85 and then engages contacts 86. The disengagement from contacts 85 results in the deenergization of the formerly energized slow release relay 12, but since the relay is slow acting the opening of its now closed contacts 92 will be delayed for a predetermined interval of time. The engagement of contacts 85 and 86 establishes a circuit from the battery 42 through the winding of the electromagnet 75, by way of conductors 87 and 88, contacts 85 and 86, conductor 93, contacts 92 of slow release relay 12 and conductors 94 and 95. The purpose of the relay 12 is to insure that magnet valve device 10 will remain energized until the electric brake is effective, as will fully appear presently.

As the pressure of fluid in chamber 58 is increased the movable abutment 56 and attached stem 63 continue to move in a direction toward the left hand, so that the contact arm 66 actuates the rheostat 6 to establish a circuit from the battery 42 for energizing the eddy current brake exciting winding 5, to thereby effect an application of the eddy current brakes. The circuit is completed by way of conductors 87, 88 and 131, contact arm 66, rheostat 6, conductor 132, one of the slip rings 21, winding 5, the other slip ring 21, and conductors 135 and 91 leading to the battery.

The degree of current supplied to the winding is governed by the amount of resistance 6 remaining in the circuit, and since the degree of resistance remaining in the circuit depends upon the pressure of fluid built up in the piston chamber 58 of the device 7, it will be apparent that the degree of energization of the eddy current brake winding 5 will be proportional to the pressure of fluid in chamber 58 which pressure is at all times in accordance with, or proportional to, movement of the handle 54 of the brake valve device 1.

Upon movement of the abutment 56 and attached stem 63 towards the left it will be evident from the drawing that the lever portion 95 of the toggle switch 11 will rotate in a counter-clockwise direction about the pin 99 and when the arm 105 has rotated past its dead center the spring mechanism 96 will operate and disengage the contact arm 101 of the switch from the arm 65 carried by the stem 63. This will however not deenergize magnet valve device 10, because as previously described the electromagnet 75 will be maintained energized through the contacts 92 of the slow release relay device 12 for a predetermined interval of time.

Assuming the speed of the vehicle to be fairly high and that the energization of the exciting winding 5 is to such a degree as to produce effective eddy current braking, the torque force exerted on the stator tending to rotate it in the direction of rotation of the rotor will be sufficient for the torque arm 14 to overcome either one of the spring assemblies 25 or 26 of the torque responsive means 13, depending upon the direction of travel of the vehicle, and bring the contact 41 into engagement with either the contact 33 or the contact 34, as the case may be.

The engagement of either of the contact 33 or 34 by the contact 41 establishes a circuit from the battery 42 through the electromagnet 75 of the electrically operated valve device 10, as will be apparent. As before stated, upon energization of electromagnet 75 contact 82 is disengaged from contacts 85 to deenergize the slow release relay 12 but it thereafter maintains its contacts 92 closed for an interval of time sufficient for the electric brake to become effective.

As the vehicle slows down due to the braking effect of the electric brake, a low speed will be reached where the torque of the eddy current brake will be insufficient to maintain the contact 41 in engagement with either contact arms 33 or 34, as the case may be, so that the circuit from the battery through the torque responsive means will be broken. The contacts 92 of the slow release relay 12 will have opened in the meanwhile so that opening of the circuit through the torque responsive means will deenergize the electromagnet 75 of the magnetically operated valve device 10. Deenergization of the electromagnet 75 permits the spring 79 to shift the double beat valve 73 to its upper seated position, thereby closing communication between chambers 71 and 77 and opening communication between chambers 74 and 71, as shown in the drawing. With the double beat valve 73 in this position fluid under pressure is supplied by way of pipe 80, chamber 74 and pipe 72 to the brake cylinder 3 to effect an application of the friction brake. Since both the eddy current brake and the friction brake are controlled by the brake valve device 1, it will be apparent that the friction brake is applied with the braking force called for by the brake valve device at the time of the changeover from electric to friction braking. Of course the degree of friction braking may thereafter be varied by manipulation of the brake valve handle 54.

When the vehicle has been brought to a stop and it is desired to release the brakes, the handle 54 of brake valve device 1 is returned to release position. With the handle in this position the control pipe 50 and connected volume reservoir 55 are vented to the atmosphere as hereinbefore described, so that fluid under pressure is vented from the brake cylinder 3, by way of pipe 72, chamber 71 of the electrically operated valve device 10, past the lower seat of the double beat valve 73, chamber 74, pipe 80, chamber 58 of fluid pressure operated device 7, pipe 60, volume reservoir 55 and pipe 50.

When the pressure of fluid in chamber 58 of the device 7 has been reduced to some low valve, the spring 62 causes the abutment and attached stem 63 and thereby the arm 65 to move in a direction toward the right hand. Movement of the abutment in this direction causes the right hand side of the arm 65 to engage arm 103 causing the lever portion 95 of the toggle switch 11 to rotate in a clockwise direction about the pin 99 and when the arm 105 has rotated past its dead center the spring mechanism 96 will operate to return the lever portion 95 to the position shown in the drawing. The other parts of the equipment which have not as yet returned to the position in which they are shown will now do so.

An emergency application of the brake may be initiated independently of the brake valve device 1, upon the opening of energizing circuit for the emergency relay 120. This circuit may be opened in a number of ways such as, by opening any one of the conductor's switches 125 on any of the cars of the train, or by a broken train wire, or by failure of the current supply to the train wire 133. With current supplied to the train 133 and all of the conductor's switches 125 closed, the relay 120 will be energized and the movable contact 124 is held up in its normal operating position, as shown in Fig. 1 of the drawing, the winding of the relay being energized through a circuit extending from the trolley 142 through the train wires 133, and the conductor's switches 125 connected in series therewith, connecting wire 134, the winding of the relay 120, and thus to the ground connection 141. When the coil of the relay 120 is deenergized in any such manner as above mentioned the movable contact 124 is actuated to connect the wires 83 and 132. With this connection made full battery current is supplied for energizing the winding 5 of the eddy current brake, whereupon the eddy current brake will provide maximum effectiveness for bringing the train to a stop. When the speed of the vehicle has been reduced to some low value in the above manner the operator may move the handle 54 of the brake valve device 1 to effect an application of the friction brake, as hereinbefore described, to bring the train to a complete stop and hold it at rest.

From the foregoing description it will be seen that I have provided a combined electric and friction brake system in which the electric brake equipment is effective for braking the vehicle at relatively high speed, while the friction brake equipment is effected for braking at relatively low speed, both equipments being controlled from a single manually conditioned fluid pressure control means, which is the brake valve device 1 in the present embodiment of the invention, and both brakes being controlled according to fluid pressure established by said control means. It will also be seen that I have provided interlocking means for automatically effecting successive applications of the electric and friction brake when making normal stops. It will also be seen that I have provided means controlled according to the braking torque exerted by the electric brake for holding the friction brake released until the braking torque of the electric brake has been reduced to some predetermined low value. It will further be seen that I have provided means for effecting an emergency application of the eddy current brakes by operation of a conductor's switch, or it may be automatically effected due to some fault in the electric system throughout the train or due to the failure of the power supply to the vehicle or train.

While one embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake system, in combination, fluid pressure brake means, electric brake means, a communication through which fluid under pressure may be supplied to effect an application of the fluid pressure brake means, means for supplying fluid under pressure to said communication, means responsive to the pressure of fluid supplied to said communication for effecting an application of the electric brake means, and means responsive to the torque of the electric brake means as long as the braking effect of the electric brake means is above a chosen value for maintaining said communication closed to the fluid pressure brake means.

2. In a vehicle brake system, in combination, a brake cylinder, an electric brake comprising an electric brake device, a communication through which fluid under pressure may be supplied to said brake cylinder, means for supplying fluid under pressure to said communication, means responsive to the pressure of fluid supplied to said communication for rendering said electric brake device effective to produce a braking effect, and means responsive to the torque of said electric brake device as long as its braking effect is above a chosen value for maintaining said communication closed to the brake cylinder.

3. In a vehicle brake system, in combination, a brake cylinder, an electric brake comprising an electric brake device, a communication through which fluid under pressure may be supplied to said brake cylinder, means for supplying fluid under pressure to said communication, means responsive to the pressure of fluid supplied to said communication for rendering said electric brake device effective to produce a braking effect, and means responsive to the torque of said electric brake device for closing said communication while the braking effect of the electric brake device is above a chosen value and operable when the braking effect of said device decreases below said chosen value for opening said communication.

4. In a vehicle brake system, in combination, a brake cylinder, an electric brake comprising an electric brake device, an electrically operated valve device for controlling a communication through which fluid under pressure may be supplied to said brake cylinder, a brake valve device for supplying fluid under pressure to said communication, a normally open switch adapted when closed to connect said electric brake device to a source of current supply to cause the device to function to effect braking, means responsive to the pressure of fluid supplied to said communication for closing said switch, another normally open switch adapted when closed to connect said electrically operated valve device to a source of current supply to effect the operation of said valve device to close said communication, and means responsive to the torque of said electric brake device as long as the braking effectiveness of the electric brake is above a chosen value for closing and maintaining closed said other switch.

5. In a vehicle brake system, in combination, a fluid pressure brake equipment including a brake cylinder, a communication through which fluid under pressure may flow to the brake cylinder to effect a fluid pressure application of the brakes, a brake valve device operative to effect the supply of fluid under pressure to said communication, an electric brake equipment including an electric brake device operative to produce a braking effect, means responsive to an initial slight increase in the pressure of fluid supplied to said communication for rendering said electric brake device effective to produce a braking effect, and means responsive to the torque of said electric brake device as long as the device produces effective braking for maintaining said communication closed to the brake cylinder.

6. In a vehicle brake system, in combination, a fluid pressure brake equipment including a brake cylinder, a communication through which fluid under pressure may flow to the brake cylinder to effect a fluid pressure application of the brakes, a brake valve device operative to effect the supply of fluid under pressure to said communication, an electric brake equipment including an electric brake device operative to produce a braking effect, an electrically controlled valve device normally holding open said communication and operative upon energization to close said communication and to at the same time establish an energizing circuit for itself, a fluid pressure responsive device operative to first establish an electrical circuit to effect the energization of said valve device and to then establish an electrical circuit to render effective said electric brake device and to thereupon open the first mentioned energizing circuit through the valve device, means responsive to the torque of the electric brake device in braking for establishing another energizing circuit for said valve device, and means operative automatically to open the energizing circuit established by the valve device for itself after a delay period of sufficient duration to permit the establishment of the energizing circuit controlled by the torque of the electric brake device.

7. In a vehicle brake system, in combination, a brake cylinder, an electric brake device, a communication through which fluid under pressure may be supplied to the brake cylinder, a brake valve device for supplying fluid under pressure to said communication, a magnet valve device operative when energized to close said communication and operative when deenergized to open said communication, a first normally open circuit, a second normally open circuit, a third normally open circuit, each of said circuits being adapted when closed to effect energization of said magnet valve device, a fluid pressure responsive means operative upon the supply of fluid under pressure to said communication for first closing said first circuit and for then rendering said electric brake device effective to produce braking and to finally effect the opening of said first circuit, contacts for closing said second circuit, said contacts being closed upon energization of said magnet valve device, means operative by the electric brake device in braking for closing said third circuit and for maintaining this circuit closed as long as the braking effort of the device is above a chosen value, and means for opening said second circuit after an interval of time of sufficient duration to permit establishment of the third circuit by said last mentioned means.

8. In a vehicle brake system, in combination, a brake cylinder, an electric brake comprising an electric brake device, a communication through which fluid under pressure may flow to the brake cylinder, a brake valve device for supplying fluid under pressure to said communication, a first normally open circuit, a second normally open circuit, a control device responsive to an initial slight increase in the pressure of fluid supplied to said communication for first closing said first circuit and for then closing said second circuit and opening said first circuit, means responsive to the closing of said first circuit for closing said communication, means responsive to closing of said second circuit for effecting an application of the electric brake, and means responsive to the torque of said electric brake device as long as the effectiveness of the electric brake is above a chosen value for maintaining said communication closed, and time delay means set in operation upon the closing of said first circuit for closing another circuit for maintaining said means in its communication closing condition for a predetermined interval of time.

9. In a combined fluid pressure and electric brake system for a vehicle, in combination, a brake cylinder, an electric brake device, a communication through which fluid under pressure may be supplied to the brake cylinder to effect an application of the fluid pressure brakes, a brake valve device for supplying fluid under pressure to the communication, a magnet valve device interposed in said communication between the brake cylinder and the brake valve device and operable when energized to close said communication and when deenergized to open said communication, means responsive to fluid under pressure supplied to said communication for first establishing a first circuit for connecting a source of current supply for effecting energization of said magnet valve device and for then establishing a second circuit for rendering the electric brake device effective to produce electric braking and to thereupon open said first circuit, means responsive to the torque of said electric brake device for establishing a third circuit from a source of current supply to said magnet valve device for maintaining it energized as long as the effectiveness of the electric brake is above a chosen value, and means set in operation by said magnet valve device upon opening of said first circuit for establishing a fourth circuit from a source of current to said magnet valve device and for maintaining this circuit for a sufficient time for said means responsive to the torque of the electric brake device to close said third circuit.

10. In a vehicle brake system, in combination, fluid pressure brake means, electric brake means operable to produce a braking effect which diminishes at low vehicle speeds, a brake control element manually operable through different degrees of movement, means for effecting an application of the electric brake means to a degree corresponding to the degree of movement of said element, and means responsive to the torque of said electric brake means for rendering the fluid pressure brake means ineffective to produce a braking effect while the effectiveness of the electric brake means is above a chosen value and for simultaneously cutting the electric brake means out of action and cutting the fluid pressure brake means into action to effect braking to a value corresponding to the position of said element at the time the effectiveness of the electric brake means diminishes to said chosen value.

11. In a vehicle brake system, in combination, fluid pressure brake means, electric brake means operable to produce a braking effect which diminishes at low vehicle speeds, a brake valve device having a handle manually operable through different degrees of movement for effecting an application of either the fluid pressure brake means or the electric brake means, a fluid pressure responsive device for effecting an application of the electric brake means to a degree corresponding to the degree of movement of said handle, an electric valve device operative when energized for rendering the fluid pressure brake means ineffective to produce a braking effect and operative when deenergized for rendering the fluid pressure brake means effective to produce a braking effect to a degree corresponding to the degree of movement of said handle, a normally open switch adapted when closed to establish a circuit for energizing said electrically operated valve device, and means responsive to the torque of said electric brake means as long as the electric brake means is effective for maintaining said switch closed and operable when the effectiveness of the electric brake means diminishes below a predetermined value for opening said switch.

12. In a vehicle brake system, in combination; a fluid pressure brake equipment including a brake cylinder, a communication through which fluid under pressure may flow to the brake cylinder to effect a fluid pressure application of the brakes, and a brake valve device operative to effect the supply of fluid under pressure to the brake cylinder; an electric brake equipment including an electric brake device operative upon energization to effect an electric application of the brakes; a magnet valve device normally holding said communication open and operative upon energization to close said communication and to establish an energizing circuit for itself; a fluid pressure responsive device operative to first establish an electrical circuit to effect the energization of said valve device and to then establish an electrical circuit to effect a braking operation of said electric brake device and to open the first mentioned energizing circuit through the valve device; means responsive to the torque of the electric brake device for establishing another energizing circuit for said valve device; and a relay controlled by said valve device and being operative automatically to open the energizing circuit established by the valve device for itself after a delay period of sufficient duration to permit the establishment of the energizing circuit controlled by the electric brake device.

13. In a vehicle brake system, in combination, fluid pressure brake means, electric brake means operable to produce a braking effect which diminishes at low vehicle speeds, a brake valve device having a handle manually operable through different degrees of movement for effecting an application of the fluid pressure brake means and the electric brake means, a fluid pressure responsive device for effecting an application of the electric brake means to a degree corresponding to the degree of movement of said handle, a magnet valve device operative when energized for rendering the fluid pressure brake means ineffective to produce a braking effect and operative when deenergized for rendering the fluid pressure brake means effective to produce a braking effect to a degree corresponding to the degree of movement of said handle, a normally open switch adapted when closed to establish a circuit for energizing said magnet valve device, a torque arm associated with said electric brake means and responsive to the torque of said electric brake means as long as the electric brake means is effective for maintaining said switch closed, and resilient means operative when the effectiveness of the electric brake means diminishes to a chosen value for actuating said arm to open said switch.

14. In a vehicle brake system, in combination, a fluid pressure brake equipment including a brake cylinder, an electric brake equipment comprising an electric brake device operable to produce a braking effect which diminishes at low vehicle speeds, said brake device having a rotor member and a stator member provided with a torque arm, resilient means adapted to engage said arm for yieldably opposing movement of said stator member in the direction of rotation of said rotor member, a brake valve device having a handle manually operable through different degrees of movement for effecting an application of the fluid pressure brake equipment and the electric brake equipment, a control device for effecting a braking operation of the electric brakes to produce braking to a degree corresponding to the degree of movement of said handle, a magnet valve device operative when energized for rendering the fluid pressure brake means ineffective to produce a braking effect and operative when deenergized for rendering the fluid pressure brake means effective to produce a braking effect to a degree corresponding to the degree of movement of said handle, a normally open circuit for energizing said magnet valve device, and a switch for closing said circuit, said switch being maintained closed by said torque arm as long as the electric brake device is operative to produce a braking torque above a chosen value, and said resilient means being operative when the braking torque diminishes to a chosen value for actuating said arm to open said switch.

15. In a vehicle brake system, in combination, a brake cylinder, an electric brake comprising an electric brake device having a rotor member and a stator member operable to produce a braking effect which diminishes at low vehicle speeds, said stator having a torque arm for resisting movement of said stator in the direction of rotation of said rotor, means including a control element manually operative through different degrees of movement for effecting application of the electric brakes and the fluid pressure brakes to a degree corresponding to the degree of movement of said element, a magnet valve device operable when energized to render the fluid pressure brake ineffective and operative when deenergized to render said fluid pressure brake effective to produce a braking effect, and means responsive to a predetermined degree of torque produced by said electric brake device for actuating said arm to establish a circuit for energizing said magnet valve device.

16. In a vehicle brake system, in combination, a fluid pressure brake equipment including a brake cylinder, an electric brake equipment including an electric brake device, a first circuit for supplying current to said electric brake device for effecting a service application of the electric brake, pressure actuated means for varying the degree of current supplied through said first circuit to said electric brake device, a brake valve device for supplying fluid under pressure to said pressure actuated means and to said brake cylinder, manually operative means for operating said brake valve device, a second circuit for supplying current to said electric brake device to effect an emergency application of the electric brakes, a normally energized relay operative when deenergized for establishing said second circuit, a switch for deenergizing said relay, and means responsive to the torque of said electric brake device operative during either a service or an emergency application of the brakes for rendering said fluid pressure brake ineffective to produce a braking effect as long as the effectiveness of electric brake is above a chosen value.

JOSEPH C. McCUNE.